US008900548B2

(12) United States Patent
Burton

(10) Patent No.: US 8,900,548 B2
(45) Date of Patent: Dec. 2, 2014

(54) SYNTHESIS OF MSE-FRAMEWORK TYPE MOLECULAR SIEVES

(71) Applicant: ExxonMobil Research and Engineering Company, Annandale, NJ (US)

(72) Inventor: Allen W. Burton, Stewartsville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 289 days.

(21) Appl. No.: 13/649,140

(22) Filed: Oct. 11, 2012

(65) Prior Publication Data

US 2013/0095030 A1   Apr. 18, 2013

Related U.S. Application Data

(60) Provisional application No. 61/546,322, filed on Oct. 12, 2011.

(51) Int. Cl.
*C01B 39/04* (2006.01)
*C01B 39/48* (2006.01)
*B01J 29/70* (2006.01)
*C01B 31/04* (2006.01)

(52) U.S. Cl.
CPC ............... *B01J 29/70* (2013.01); *C01B 39/04* (2013.01); *C01B 39/48* (2013.01); *C01B 31/0438* (2013.01)
USPC ........................................................ 423/706

(58) Field of Classification Search
CPC .......... C01B 39/04; C01B 39/48; B01J 29/70
USPC ........................................................ 423/706
See application file for complete search history.

(56) References Cited

U.S. PATENT DOCUMENTS 3,354,078 A   11/1967   Miale et al.
4,391,785 A   7/1983   Rosinski et al.
(Continued)

FOREIGN PATENT DOCUMENTS

EP   1194375 B1   12/2003
EP   1852394 A1   1/2006
(Continued)

OTHER PUBLICATIONS

Lobo et al., "Synthesis and Rietveld Refinement of the Small-Pore Zeolite SSZ-16", Chemistry of Materials (1996), 8 (10), 2409-2411.
(Continued)

*Primary Examiner* — David M Brunsman
(74) *Attorney, Agent, or Firm* — David M. Weisberg

(57) ABSTRACT

An aspect of the invention relates to a method of synthesizing a crystalline molecular sieve having an MSE framework type, the method comprising crystallizing a reaction mixture comprising a source of water, a source of an oxide of a tetravalent element, Y, selected from at least one of silicon, tin, titanium, vanadium, and germanium, optionally but preferably a source of a trivalent element, X, a source of an alkali or alkaline earth metal, M, a source of a first single-nitrogen-containing cyclic ammonium organic cation, Q1, and optionally a source of a second multiple-nitrogen-containing organic cation, Q2, which can include multiple-nitrogen-containing monocations and/or multiply ionic species containing two or more ammonium cations in the same molecule.

17 Claims, 4 Drawing Sheets

Powder XRD of product (MCM-68) from Example 64

(56) References Cited

U.S. PATENT DOCUMENTS

| | | | |
|---|---|---|---|
| 4,481,177 | A | 11/1984 | Valyocsik |
| 4,508,837 | A | 4/1985 | Zones |
| 4,557,919 | A | 12/1985 | Sumitani et al. |
| 4,689,207 | A | 8/1987 | Zones |
| 5,187,132 | A | 2/1993 | Zones et al. |
| 6,027,707 | A | 2/2000 | Casci et al. |
| 6,049,018 | A * | 4/2000 | Calabro et al. ............... 585/446 |
| 6,086,848 | A | 7/2000 | Nakagawa et al. |
| 6,649,141 | B2 | 11/2003 | Camblor Fernández et al. |
| 7,198,711 | B1 | 4/2007 | Chester et al. |
| 7,485,766 | B2 | 2/2009 | Burton, Jr. et al. |
| 7,648,694 | B2 | 1/2010 | Burton, Jr. |
| 7,922,997 | B2 * | 4/2011 | Moscoso et al. ............ 423/718 |
| 8,025,863 | B2 * | 9/2011 | Strohmaier et al. .......... 423/706 |
| 8,562,941 | B2 * | 10/2013 | Johnson et al. ............... 423/700 |
| 2008/0035524 | A1 | 2/2008 | Corma Canos et al. |
| 2009/0104112 | A1 | 4/2009 | Burton, Jr. et al. |
| 2009/0214418 | A1 | 8/2009 | Burton, Jr. et al. |
| 2009/0318696 | A1 | 12/2009 | Strohmaier et al. |
| 2010/0081775 | A1 | 4/2010 | Moscoso et al. |
| 2010/0272624 | A1 | 10/2010 | Fecant et al. |

FOREIGN PATENT DOCUMENTS

| | | |
|---|---|---|
| EP | 2174911 A1 | 4/2010 |
| FR | 2936791 A1 | 7/2008 |
| JP | 2004010537 | 1/2004 |
| WO | 2009004131 A1 | 1/2009 |
| WO | 2009090336 A1 | 7/2009 |
| WO | 2010065318 A2 | 11/2009 |
| WO | 2010015732 A1 | 2/2010 |
| WO | 2010015733 A1 | 2/2010 |
| WO | 2010015736 A1 | 2/2010 |
| WO | 2010015737 A1 | 2/2010 |
| WO | 2010065319 A2 | 6/2010 |

OTHER PUBLICATIONS

Jackowski et al., "Qiquaternary Ammonium Compounds in Zeolite Synthesis: Cryclic and Polycyclic N-Heterocycles Connected by Methylene Chains", Journal of the American Chemical Society (2009), 131 (3), 1092-1100.

Jackowski et al., "A study on zeolite synthesis from diquaternary ammonium compounds; the effect of changing end-group heterocycles in the HF/Sio2 synthesis of molecular sieves", Studies in Surface Science and Catalysis (2008), 174A (Zeolites and Related Materials), 11-116.

Zones et al., "A Most Unusual Zeolite Templating: Cage to Cage Connection of One Guest Molecule", Journal of Physical Chemistry C (2010), 114(19), 8899-8904.

Zones et al., "Further studies on the conversion of Cubic P zeolite to high silica organozeolites", Zeolites (1988), 8(5), 409-15.

Liu et al., The First Zeolite with Three-Dimensional Intersecting Straight-Channel System of 12-Membered Rings, Journal of the American Chemical Society (2001), 123(22), 5370-5371.

Carati et al., "Synthesis of zeolites using N,N'-tetramethylen-bis-(N-methylpiperidinium) dihydroxydes as directing agent", Studies in Surface Science and Catalysis (2008), 174A(Zeolites and Related Materials), 269-272.

Tagliabue et al., "Multivariate approach to zeolite synthesis", Catalysis Today (2003), 81(3), 405-412.

Koller et al., "Five-Coordinate Silicon in High-Silica Zeolites", Journal of the American Chemical Society (1999), 121 (14), 3368-3376.

Diaz-Cabanas et al., "Zeolite syntheses using linear diquats of varying length in fluoride media. The synthesis of ITQ-8, ITQ-10, ITQ-14 and high silica Nu-87", Journal of Materials Chemistry (2002), 12(2), 249-257.

Barrett et al., "Synthesis of defect-free pure silica polymorphs of low framework density in aqueous fluoride media", Proceedings of the International Zeolite Conference, 12th, Baltimore, Jul. 5-10, 1998 (1999), Meeting Date 1998, vol. 3, 1495-1502.

Corma et al., "Amorphous microporous molecular sieves with different pore dimensions and topologies: Synthesis, characterization and catalytic activity", Microporous and Mesoporous Materials (2006), 89(1-3), 39-46.

Springuel-Huet et al., "Amorphous microporous molecular sieves studied by laser-polarized 129Xe NMR spectroscopy", Studies in Surface Science and Catalysis (2007), 170A(From Zeolites to Porous Mof Materials), 812-817.

Noble et al., "Microporous magnesium aluminophosphate STA-1: synthesis with a rationally designed template and structure elucidation by microcrystal diffraction", Angewandte Chemie, International Edition in English (1997), 36 (112),81-83.

DeMoor et al., "Imaging the assembly process of the organic-mediated synthesis of a zeolite", Chemistry—A European Journal (1999), 5(7), 2083-2088.

Noble et al., "The templated synthesis and structure determination by synchrotron microcrystal diffraction of the novel small pore magnesium aluminophosphate STA-2", ournal of the Chemical Society, Dalton Transactions: Inorganic Chemistry (1997), (23), 4485-4490.

Douglas L. Dorset, Simon C. Weston, and Sandeep S. Dhingra; "Crystal Structure of Zeolite MCM-68: A New Three-Dimensional Dimensional Framework with Large Pores", Journal of Physical Chemistry B, 110, 2045 (2006).

Weisz et al., "Superactive Crystalline Aluminosilicate Hydrocarbon Catalysts", Journal of Catalysis, 4, 527 (1965).

Maile et al, "Catalysis by Crystalline Aluminosilicates IV. Attainable Catalytic Cracking Rate Constants, and Superactivity", Journal of Catalysis, 6, 278 (1966).

Olson et al., "Chemical and Physical Properties of the ZSM-5 Substitutional Series", Journal of Catalysis, 61, 395 (1980).

"Non-thermal calcination by ultraviolet irradiation in the synthesis of microporous materials", Micropor. and Mesopor. Marls, vol. 76 (1-3), Dec. 2004, pp. 17-22.

Yoshihito et al., "Multi-Dimensional Microporous Silicate That is Isomorphous to Zeolite MCM-68", Angewandte Chemie International Edition, vol. 47, No. 6, Jan. 25, 2008, pp. 1042-1046 ISSN: 1433-7851.

"Zeolite synthesis in the presence of organic components", Chimica E L'Industria, Societa Chimica Italiano, Milano, IT, vol. 67, No. 1-2, Jan. 1, 1985, pp. 21-34.

International Search Report and Written Opinion from PCT/US2012/059693 dated Dec. 18, 2012.

International Search Report and Written Opinion from PCMS2012/059678 dated Feb. 7, 2013. (Related case).

* cited by examiner

Powder XRD traces from seeded preparations with N-methyl-N-butylpyrrolidinium cation as the structure directing agent.

SEM images of product from Example 35

Powder XRD of product (MCM-68) from Example 64

Figure 4. SEM Images of product from Example 64

Powder XRD of product from Example 66

SYNTHESIS OF MSE-FRAMEWORK TYPE MOLECULAR SIEVES

CROSS-REFERENCE TO RELATED APPLICATIONS

This application claims the benefit of U.S. Provisional Application No. 61/546,322, filed on Oct. 12, 2011, the entire contents of which are hereby incorporated by reference herein.

FIELD OF THE INVENTION

This invention relates to the synthesis of crystalline molecular sieves of the MSE framework-type, such as MCM-68, and to their use in organic conversion processes.

BACKGROUND OF THE INVENTION

MCM-68 is a single crystalline phase molecular sieve material which has a unique 3-dimensional channel structure comprising one 12-membered ring channel system and two 10-membered ring channel systems, in which the channels of each system extend perpendicular to the channels of the other systems and in which the 12-ring channels are generally straight and the 10-ring channels are tortuous (sinusoidal). The framework structure of MCM-68 has been assigned code MSE by the Structure Commission of the International Zeolite Association.

The composition and characterizing X-ray diffraction pattern of MCM-68 are disclosed in U.S. Pat. No. 6,049,018, which also describes the synthesis of the molecular sieve in the presence of a structure directing agent comprising the N,N,N',N'-tetraethylbicyclo[2.2.2]oct-7-ene-2,3:5,6-dipyrrolidinium dication. The entire contents of U.S. Pat. No. 6,049,018 are incorporated herein by reference.

U.S. Pat. No. 6,049,018 exemplifies the use of MCM-68 as a catalyst in aromatic alkylation and transalkylation reactions. In addition, U.S. Pat. No. 7,198,711 discloses that MCM-68 shows activity in the catalytic cracking of hydrocarbon feedstocks to produce an enhanced yield of butylenes and isobutene, with the MCM-68 either being the primary cracking catalyst or an additive component in conjunction with a conventional large pore cracking catalyst, such as zeolite Y.

The commercial development of MCM-68 has been hindered by the high cost of the N,N,N',N'-tetraethylbicyclo[2.2.2]oct-7-ene-2,3:5,6-dipyrrolidinium dication structure directing agent required in U.S. Pat. No. 6,049,018 for its synthesis and hence there has been significant interest in finding alternative, less expensive structure directing agents for the synthesis of MCM-68.

In U.S. Patent Application Publication No. 2009/0318696, it is stated that 1,1-dialkyl-4-cyclohexylpiperazin-1-ium cations and 1,1-diakl-4-alkylcyclohexylpiperazin-1-ium cations are effective as structure directing agents in the synthesis of MCM-68. U.S. Patent Application Publication No. 2009/0318696 describes the use of MCM-68 seeds in the synthesis of MCM-68.

UZM-35 can have some similarities in structure to MSE framework type materials in general, and to MCM-68 in particular. U.S. Patent Application Publication No. 2010/0081775 discloses a method for synthesizing UZM-35 using simpler, singly-charged cations. This reference, however, does note that UZM-35 has a unique x-ray diffraction pattern, different from MCM-68.

According to the present invention, it has now been found that relatively simple cations described herein can be effective as structure directing agents in the synthesis of MCM-68. Furthermore, it has been found that MCM-68 can be prepared with many of these cations in seeded preparations.

SUMMARY OF THE INVENTION

In one aspect, the present invention relates to a method of synthesizing a crystalline molecular sieve having an MSE framework type, the method comprising crystallizing a reaction mixture comprising a source of water, a source of an oxide of a tetravalent element, Y, selected from at least one of silicon, tin, titanium, vanadium, and germanium, optionally a source of a trivalent element, X, a source of an alkali or alkaline earth metal, M, and a source of a first organic cation, Q1, having one or both of the two following general structures:

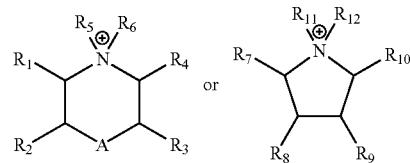

where A is a $>CR_{13}R_{14}$ group, a $>C=O$ group, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, and where one of the $R_5$ and $R_6$ groups can alternately be connected to one of the $R_{13}$ and $R_{14}$ groups to form a $C_1$-$C_5$ hydrocarbon linking moiety.

DETAILED DESCRIPTION OF THE EMBODIMENTS

Figure 1:
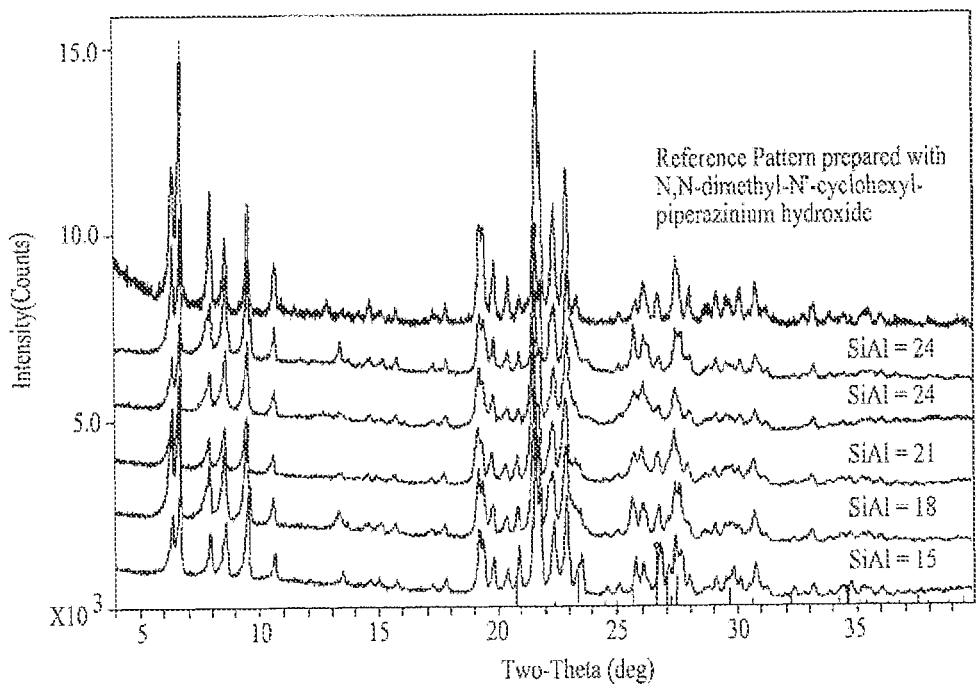
FIG. 1 shows an array of powder x-ray diffraction (XRD) traces from seeded preparations with N-methyl-N-butylpyrrolidinium cation as the structure directing agent, at various Si/Al molar ratios, and a comparison to a powder XRD trace from a comparative sample.

Described herein is a method of synthesizing a crystalline molecular sieve having the MSE framework type, such as MCM-68, using cyclic ammonium cations as (one of) the structure directing agent(s). Also described herein is the use of the calcined form of the resultant MSE framework type crystalline molecular sieve as a catalyst in organic conversion reactions, such as in aromatic alkylation and transalkylation reactions and in the catalytic cracking of hydrocarbon feedstocks.

MCM-68 is a synthetic porous single crystalline phase material that has a unique 3-dimensional channel system comprising one 12-membered ring channel system and two 10-membered ring channel systems, in which the channels of each system extend perpendicular to the channels of the other systems and in which the 12-ring channels are generally straight and the 10-ring channels are generally tortuous (sinusoidal). The framework structure of MCM-68 has been assigned code MSE by the Structure Commission of the International Zeolite Association.

In its calcined form, MCM-68 has an X-ray diffraction (XRD) pattern which is distinguished from the patterns of other known as-synthesized and/or thermally treated crystalline materials by the lines listed in Table 1 below.

TABLE 1

| d (Å) | Relative Intensity [100 × I/I$_o$] |
|---|---|
| 13.60 +/− 0.39 | S |
| 13.00 +/− 0.37 | VS |
| 10.92 +/− 0.31 | M |
| 10.10 +/− 0.29 | M |
| 9.18 +/− 0.26 | VS |
| 8.21 +/− 0.23 | W |
| 4.58 +/− 0.13 | W |
| 4.54 +/− 0.13 | W |
| 4.45 +/− 0.13 | VW-W |
| 4.32 +/− 0.12 | VW |
| 4.22 +/− 0.12 | VW |
| 4.10 +/− 0.12 | VS |
| 4.05 +/− 0.11 | M |
| 3.94 +/− 0.11 | M |
| 3.85 +/− 0.11 | M |
| 3.80 +/− 0.11 | VW |
| 3.40 +/− 0.10 | W |
| 3.24 +/− 0.09 | W |
| 2.90 +/− 0.08 | VW |

Though described as d-spacings herein, the peaks observed in XRD spectra have maxima in intensity, and the peak maxima correspond to the d-spacing "lines" listed herein. These X-ray diffraction data were collected with a Bruker D8 Discover diffraction system using Cu-Kα radiation and equipped with a Göbel mirror and HI-STAR area detector. The XRD spectra were recorded by measuring the diffraction pattern in two frames, the first frame from about 4° to about 20° 2θ, and the second from about 20° to about 36° 2θ. The two-dimensional dimensional patterns were integrated and converted to 1-dimensional plots of 2θ versus intensity using the Bruker GADDs software. The interplanar (d-) spacings were calculated in Angstrom units, and the relative intensities of the lines, I/I$_o$, adjusted as percentages of the intensity of the strongest line, I$_o$, above background, were derived with the use of Materials Data, Inc., Jade software peak search algorithm. The intensities were uncorrected for Lorentz and polarization effects. The relative intensities are given in terms of the symbols VS=very strong (80-100%), S=strong (60-80%), M=medium (40-60%), W=weak (20-40%), and VW=very weak (0-20%). It should be understood that diffraction data listed for these samples as single lines may consist of multiple overlapping lines which under certain conditions, such as differences in crystallographic changes, may appear as resolved or partially resolved lines. Typically, crystallographic changes can include minor changes in unit cell parameters and/or changes in crystal symmetry, without a corresponding change in the structure. These minor effects, including changes in relative intensities, can additionally or alternately occur as a result of differences in cation content, framework composition, nature and degree of pore filling, crystal size and shape, preferred orientation, and thermal and/or hydrothermal history, inter alia.

The structure of MCM-68 is further discussed in U.S. Pat. No. 7,198,711 and in the *Journal of Physical Chemistry B*, 110, 2045 (2006).

MCM-68 has a chemical composition involving the molar relationship: $X_2O_3:(n)YO_2$, wherein X is a trivalent element selected from at least one of aluminum, boron, gallium, iron, and chromium, preferably at least including aluminum; Y is a tetravalent element selected from at least one of silicon, tin, titanium, vanadium, and germanium, preferably at least including silicon; and n is at least about 4, such as from about 4 to about 100,000, and can typically be from about 10 to about 1000, for example from about 10 to about 100.

MCM-68 is generally thermally stable and, in the calcined form, can exhibit a relatively high surface area (e.g., about 660 m$^2$/g with micropore volume of about 0.21 cc/g) and significant hydrocarbon sorption capacity, e.g.:

| | |
|---|---|
| n-Hexane sorption at ~75 torr, ~90° C. | ~10.8 wt % |
| Benzene sorption at ~75 torr, ~30° C. | ~18.8 wt % |
| 2,2-Dimethylbutane sorption at ~60 torr, ~120° C. | ~11.0 wt % |
| Mesitylene sorption at ~2 torr, ~100° C. | ~3.3 wt %. |

In its active, hydrogen form, MCM-68 can exhibit a relatively high acid activity, with an Alpha Value of about 900 to about 2000. Alpha Value is an approximate indication of the catalytic cracking activity of the catalyst compared to a standard catalyst, and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; and in the *Journal of Catalysis*, 4, 527 (1965); 6, 278 (1966); and 61, 395 (1980), each incorporated herein by reference as to that description. The experimental conditions of the test used herein include a constant temperature of ~538° C. and a variable flow rate, as described in detail in the *Journal of Catalysis*, 61, 395 (1980).

As disclosed in U.S. Pat. No. 6,049,018, MCM-68 has previously been synthesized using N,N,N',N'-tetraethylbicyclo[2.2.2]oct-7-ene-2,3:5,6-dipyrrolidinium dications as the structure directing agent. However, the high cost of this structure directing agent has significantly hindered the commercial development of MCM-68.

The present method of synthesizing MCM-68 employs as at least a portion of the structure directing agent cations having one or both of the following two general structures (collectively Q1):

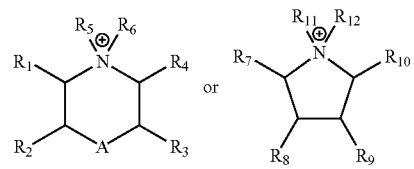

where A is a >CR$_{13}$R$_{14}$ group, a >C=O group, or an >O group, where R$_1$, R$_2$, R$_3$, R$_4$, R$_7$, R$_8$, R$_9$, and R$_{10}$ are each independently hydrogen, a hydroxyl group, or a C$_1$-C$_5$ hydrocarbon chain, where R$_{13}$ and R$_{14}$ are each independently hydrogen or a C$_1$-C$_5$ hydrocarbon chain, where R$_5$, R$_6$, R$_{11}$, and R$_{12}$ are each independently a C$_1$-C$_5$ hydrocarbon chain, and where one of the $R_5$ and $R_6$ groups can alternately be connected to one of the $R_{13}$ and $R_{14}$ groups to form a $C_1$-$C_5$ hydrocarbon linking moiety.

Suitable sources of the monocation structure directing agents herein can include any salts of these monocations that are not detrimental to the formation of the crystalline material MCM-68, for example, with halides (e.g., iodides) and/or hydroxides as counterions. Thus, though the ammonium nitrogen may not be covalently bonded to any hydroxyl groups, a hydroxyl ion may be an appropriate counterion.

Exemplary single-nitrogen-containing cyclic ammonium monocations (Q1) can include, but are not limited to, 4,4-dialkyl-piperidinium cations (e.g., 4-methyl-4-ethyl-piperidinium, 4-methyl-4-propyl-piperidinium, 4-methyl-4-butyl-piperidinium, 4,4-diethyl-piperidinium, 4-ethyl-4-propyl-piperidinium, 4-ethyl-4-butyl-piperidinium, and the like, and combinations thereof), N-alkyl-quinuclidinium cations (e.g., N-methyl-quinuclidinium, 3-hydroxy-N-methyl-quinuclidinium, and the like, and a combination thereof), 4,4-dialkyl-morpholinium cations (e.g., 4-methyl-4-ethyl-morpholinium, 4-methyl-4-propyl-morpholinium, 4-methyl-4-butyl-morpholinium, 4,4-diethyl-morpholinium, 4-ethyl-4-propyl-morpholinium, 4-ethyl-4-butyl-morpholinium, and the like, and combinations thereof), 4,4-dialkyl-pyrrolidinium cations (e.g., 4-methyl-4-ethyl-4-methyl-4-propyl-pyrrolidinium, 4-methyl-4-butyl-pyrrolidinium, 4,4-diethyl-pyrrolidinium, 4-ethyl-4-propyl-pyrrolidinium, 4-ethyl-4-butyl-pyrrolidinium, and the like, and combinations thereof), and the like, and combinations thereof.

Optionally, a second multiple-nitrogen-containing cation (Q2) can also be present as a portion of the structure directing agent for MCM-68 according to the present invention. Such second cation can include, but is not limited to: an ammonium cation with a hindered piperazine structure having a general formula similar to (Q1A) but where A is an >N—$R_{15}$ group, and where $R_{15}$ is a bulky $C_4$-$C_{12}$ hydrocarbon moiety (e.g., a cyclic, branched, and/or hydroxy-functionalized hydrocarbon moiety); a dual ammonium dication; or a combination thereof.

In one embodiment, the dual ammonium dication can have the general structure: $R_1$—$R_3$—$R_2$, where $R_1$ and $R_2$ are the same or different, and where $R_1$ and/or $R_2$ are an N-alkylpiperidinium group of the formula

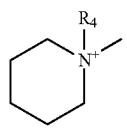

(I)

or where $R_1$ and/or $R_2$ are a quinuclidinium group of the formula

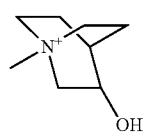

(II)

where $R_3$ is a polymethylene group of the formula $(CH_2)_n$, where n is from 4 to 6, or where $R_3$ is a cylcoalkylene group having from 5 to 8 carbon atoms, and where $R_4$ is a $C_1$-$C_4$ alkyl group, for example a methyl group.

Additionally or alternately, the dual ammonium dication can be a bicyclooctene-bis(N,N-dialkylpyrrolidinium) cation, such as N,N,N',N'-tetraalkylbicyclo[2.2.2]oct-2-ene-5,6:7,8-dipyrrolidinium where each alkyl group is independently $C_1$-$C_4$ alkyl. When each alkyl group is an ethyl moiety, the structure can be as follows:

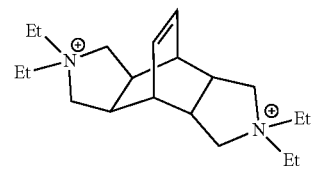 [SMILES: CC[N+]1(CC)CC2C3C=CC(C2C1)C1C[N+](CC)(CC)CC31]

Specifically when more than one cation source is used in the structure directing agent composition, the molar ratio of single-nitrogen-containing cyclic ammonium (first) monocation to second multiple-nitrogen-containing cation can be at least about 1:9, e.g., at least about 1:7, at least about 1:5, at least about 1:4, at least about 1:3, at least about 1:2, at least about 1:1, at least about 3:2, at least about 2:1, at least about 5:2, at least about 3:1, at least about 4:1, at least about 5:1, at least about 7:1, at least about 9:1, at least about 19:1, or at least about 49:1. Additionally or alternately, when more than one cation source is used in the structure directing agent composition, the molar ratio of cyclic ammonium (first) cation to second cation can be about 999:1 or less, about 499:1 or less, about 199:1 or less, about 99:1 or less, about 49:1 or less, about 19:1 or less, about 9:1 or less, about 7:1 or less, about 5:1 or less, about 4:1 or less, about 3:1 or less, about 2:1 or less, or about 1:1 or less.

Suitable sources of the dual ammonium cation structure directing agents herein can include any salts of these dual ammonium cations that are not detrimental to the formation of the crystalline material MCM-68, for example, with halides (e.g., iodides) and/or hydroxides as counterions.

In the present method, a reaction mixture is produced comprising a source of water, a source of an oxide of a tetravalent element, Y, selected from at least one of silicon, tin, titanium, vanadium, and germanium, a source of an oxide of trivalent element, X, selected from at least one of aluminum, boron, gallium, iron, and chromium, a source of an alkali or alkaline earth metal, M, together with a source of Q1 cations and optionally a source of Q2 cations (with Q herein representing all structure directing cations, Q1+Q2). Generally, the composition of the reaction mixture can be controlled so that the molar ratio $Q/YO_2$ in said reaction mixture is in the range from about 0.01 to about 1, e.g., from about 0.03 to about 0.7, from about 0.05 to about 0.5, or from about 0.07 to about 0.35. Additionally or alternately, the composition of the reaction mixture can be controlled by selecting one or more of the following molar ratios: $YO_2/X_2O_3$ from about 4 to about 200, e.g., from about 4 to about 150, from about 4 to about 120, from about 4 to about 100, from about 4 to about 80, from about 6 to about 200, from about 6 to about 150, from about 6 to about 120, from about 6 to about 100, from about 6 to about 80, from about 8 to about 200, from about 8 to about 150, from about 8 to about 120, from about 8 to about 100, from about 8 to about 80, from about 12 to about 200, from about 12 to about 150, from about 12 to about 120, from about 12 to about 100, from about 12 to about 80, from about 15 to about 200, from about 15 to about 150, from about 15 to about 120, from about 15 to about 100, from about 15 to about 80, from about 18 to about 200, from about 18 to about 150, from about 18 to about 120, from about 18 to about 100, or from about 18 to about 80; H$_2$O/YO$_2$ from about 5 to about 200, e.g., from about 5 to about 150, from about 5 to about 100, from about 5 to about 50, from about 5 to about 35, from about 10 to about 200, from about 10 to about 150, from about 10 to about 100, from about 10 to about 50, from about 10 to about 35, from about 14 to about 200, from about 14 to about 150, from about 14 to about 100, from about 14 to about 50, from about 14 to about 35, from about 18 to about 200, from about 18 to about 150, from about 18 to about 100, from about 18 to about 50, or from about 18 to about 35; OH$^-$/YO$_2$ from about 0.05 to about 1, e.g., from about 0.05 to about 0.85, from about 0.05 to about 0.75, from about 0.05 to about 0.65, from about 0.15 to about 1, from about 0.15 to about 0.85, from about 0.15 to about 0.75, from about 0.15 to about 0.65, from about 0.25 to about 1, from about 0.25 to about 0.85, from about 0.25 to about 0.75, or from about 0.25 to about 0.65; and M/YO$_2$ from about 0.05 to about 2, e.g., from about 0.05 to about 1.5, from about 0.05 to about 1.2, from about 0.05 to about 0.9, from about 0.05 to about 0.7, from about 0.05 to about 0.60, from about 0.10 to about 2, from about 0.10 to about 1.5, from about 0.10 to about 1.2, from about 0.10 to about 0.9, from about 0.10 to about 0.7, from about 0.10 to about 0.60, from about 0.15 to about 2, from about 0.15 to about 1.5, from about 0.15 to about 1.2, from about 0.15 to about 0.9, from about 0.15 to about 0.7, from about 0.15 to about 0.60, from about 0.20 to about 2, from about 0.20 to about 1.5, from about 0.20 to about 1.2, from about 0.20 to about 0.9, from about 0.20 to about 0.7, or from about 0.20 to about 0.60. It should be noted that, although molar ratios of OH$^-$/YO$_2$ are used throughout this description, it should be understood that such molar ratios are meant to encompass whatever the chemical nature of the non-detrimental counterions of M and Q, and are only expressed herein as OH$^-$/YO$_2$ because hydroxyl counterions were specifically used. Similarly, where specific examples of Y, X, M, and Q are mentioned herein in molar ratios, their ranges should be understood to extend generically to the variable, unless expressly disclaimed, and not necessarily merely limited to the individual species of the variable genus.

In certain embodiments, the reaction mixture can have a composition, in terms of mole ratios of oxides, within all of the following ranges:

| Reactants | Useful | Preferred |
|---|---|---|
| YO$_2$/X$_2$O$_3$ | ~4 to ~200 | ~8 to ~120 |
| H$_2$O/YO$_2$ | ~5 to ~200 | ~14 to ~50 |
| OH$^-$/YO$_2$ | ~0.05 to ~1 | ~0.15 to ~0.75 |
| M/YO$_2$ | ~0.05 to ~2 | ~0.10 to ~0.90 |
| Q/YO$_2$ | ~0.01 to ~1 | ~0.03 to ~0.7 |

The reaction mixture can also optionally (but typically) comprise seeds of MSE framework type molecular sieve, such as MCM-68, for example, such that the weight ratio of seeds/YO$_2$ in the reaction mixture can be between about 0.001 and about 0.3, such as between about 0.01 and about 0.08 or between about 0.01 and about 0.05. However, such seeds may not be necessary and may be specifically omitted in certain embodiments.

The tetravalent element, Y, may comprise or be silicon, the trivalent element, X, may comprise or be aluminum, and the alkali or alkaline earth metal, M, may comprise at least one of sodium and potassium. When the alkali or alkaline earth metal, M, comprises potassium, the molar ratio of Na to the total metal M may be from 0 to about 0.9, for example, from 0 to about 0.5. Thus, in certain embodiments, the alkali or alkaline earth metal can comprise substantially no sodium (e.g., less than 5 wt % of M can be sodium, such as less than 3 wt %, less than 1 wt %, less than 0.5 wt %, less than 0.3 wt %, less than 0.1 wt %, less than 0.05 wt %, or 0 wt %); additionally or alternately, the reaction mixture may comprise no added sodium (i.e., though some sodium may be present as an impurity in one or more of the reaction mixture ingredients, no component is added specifically to introduce sodium to the reaction mixture—e.g., though potassium hydroxide may contain some sodium hydroxide impurity, no sodium hydroxide is added).

Suitable sources of silicon oxide that can be used to produce the reaction mixture described above can include, but are not limited to, colloidal silica, precipitated silica, potassium silicate, sodium silicate, fumed silica, and the like, as well as combinations thereof. Suitable sources of aluminum oxide can include, but are not limited to, hydrated aluminum oxides, such as boehmite, gibbsite, and pseudoboehmite, especially gibbsite, as well as oxygen-containing aluminum salts, such as aluminum nitrate, and the like, as well as combinations thereof. Suitable sources of alkali metal can include sodium and/or potassium hydroxide.

Irrespective of the source of the structure directing agent(s), when the reaction mixture has been prepared, crystallization to produce the desired MCM-68 can be conducted under either static or stinted conditions in a suitable reactor vessel, such as for example, polypropylene jars or stainless steel autoclaves optionally lined with Teflon®, e.g., at a temperature between about 100° C. and about 200° C. for up to about 28 days, such as at a temperature between about 145° C. and about 175° C. for about 24 hours to about 170 hours. Thereafter, the crystals can be separated from the liquid and recovered.

The product of the synthesis reaction can advantageously comprise or be a crystalline molecular sieve having the MSE framework type and containing within its pore structure the structure directing agent(s) described herein. The resultant as-synthesized material can have an X-ray diffraction pattern distinguishable from the patterns of other known as-synthesized or thermally treated crystalline materials.

As-synthesized crystalline molecular sieve containing structure directing agent(s) within its pore structure can normally be activated before use in such a manner as to substantially remove the structure directing agent(s) from the molecular sieve, leaving active catalytic sites within the microporous channels of the molecular sieve open for contact with a feedstock. The activation process can typically be accomplished by heating the molecular sieve at a temperature from about 200° C. to about 800° C. for an appropriate period of time in the presence of an oxygen-containing gas. Alternately, activation can be accomplished (e.g. the SDA effectively removed) by exposure to ozone at temperatures below about 500° C. e.g., about 300° C. or less, for instance as disclosed A. N. Parikh et al., "Non-thermal calcination by ultraviolet irradiation in the synthesis of microporous materials," *Micropor. & Mesopor. Mat'ls*, vol. 76(1-3), December 2004, pp. 17-22, the contents of which are hereby incorporated by reference herein.

To the extent desired, the original alkali (and/or alkaline earth) cations of the as-synthesized material can be replaced in accordance with techniques well known in the art, at least in part, e.g., by ion exchange with other cations, which can include, but are not limited to, metal ions, hydrogen ions, hydrogen ion precursors, e.g., ammonium ions, and the like, and mixtures thereof. Particularly preferred exchange cations, when present, can include those that can tailor the catalytic activity for certain hydrocarbon conversion reactions (e.g., hydrogen, rare earth metals, and metals of Groups 3, 4, 5, 6, 7, 8, 9, 10, 11, 12, and 13 of the Periodic Table of the Elements; when the cations are alkali metal cations, the exchange cations can additionally or alternately include alkaline earth, or Group 2, metals).

The crystalline molecular sieve produced by the present process can be used to catalyze a wide variety of organic compound conversion processes including many of present commercial/industrial importance. Examples of chemical conversion processes effectively catalyzed by the crystalline material of this invention, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain ($C_{10}$-$C_{20}$) olefins, in the gas or liquid phase, with reaction conditions optionally including one or more of a temperature from about 250° C. to about 500° C., a pressure from about 0 psig to 500 psi, (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag) to about 500 psig (about 3.5 MPag), and a WHSV from about 1 $hr^{-1}$ to about 10,000 $hr^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 $hr^{-1}$ to about 50 $hr^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 $hr^{-1}$ to about 10 $hr^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 $hr^{-1}$ to about 10 $hr^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 $hr^{-1}$ to about 10 $hr^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 $hr^{-1}$ to about 10 $hr^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 $hr^{-1}$ to about 20 $hr^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 $hr^{-1}$ to about 500 $hr^{-1}$; and (m) a hydrocarbon trap (e.g., pre-catalytic converter adsorbent) for cold start emissions in motor vehicles.

As described in U.S. Pat. No. 7,198,711, MCM-68 may be used as an additive component in conjunction with a conventional cracking catalyst, such as a large pore molecular sieve having a pore size greater than about 7 Angstroms.

As in the case of many catalysts, it may be desirable to incorporate the molecular sieve produced by the present process with another material resistant to the temperatures and other conditions employed in organic conversion processes. Such materials can include active and inactive materials and synthetic or naturally occurring zeolites, as well as inorganic materials such as clays, silica, and/or metal oxides such as alumina. The latter may be naturally occurring and/or in the form of gelatinous precipitates/gels including mixtures of silica and metal oxides. Use of a material in conjunction with the molecular sieve produced by the present process (i.e., combined therewith and/or present during synthesis of the new crystal), which is active, can tend to change the conversion capability and/or selectivity of the catalyst in certain organic conversion processes. Inactive materials suitably tend to serve merely as diluents, to control the amount of conversion in a given process so that products can be obtained economically and orderly, for instance without employing too many other means for controlling the rate of reaction. These inventive materials may be incorporated into naturally occurring clays, e.g., bentonite and/or kaolin, to improve the crush strength of the catalyst under commercial operating conditions. Said materials (i.e., clays, oxides, etc.) can additionally or alternately function as binders for the catalyst. It can be desirable to provide a catalyst having good crush strength, because, in commercial use, it can often be desirable to prevent the catalyst from breaking down into powder-like materials. These clay and/or oxide binders have been employed normally only for the purpose of improving the crush strength of the catalyst.

Naturally occurring clays that can be composited with the molecular sieve produced by the present process can include, but are not limited to, the montmorillonite and kaolin families, which include the subbentonites and the kaolins commonly known as Dixie, McNamee, Georgia, and Florida clays and/or others in which the main mineral constituent can be halloysite, kaolinite, dickite, nacrite, and/or anauxite. Such clays can be used in the raw state as originally mined and/or initially subjected to calcination, acid treatment, and/or chemical modification. Binders useful for compositing with the molecular sieve produced by the present process can additionally or alternately include inorganic oxides, such as silica, zirconia, titania, magnesia, beryllia, alumina, and mixtures thereof.

Additionally or alternately, the molecular sieve produced by the present process can be composited with a porous matrix material such as silica-alumina, silica-magnesia, silica-zirconia, silica-thoria, silica-beryllia, silica-titania, and/or ternary compositions such as silica-alumina-thoria, silica-alumina-zirconia silica-alumina-magnesia, and silica-magnesia-zirconia.

The relative proportions of finely divided crystalline molecular sieve material and inorganic oxide matrix vary widely, with the crystal content ranging from about 1% to about 90% by weight and more usually, particularly when the composite is prepared in the form of beads or extrudates, ranging from about 2% to about 80% by weight of the composite.

Additionally or alternately, the present invention can include one or more of the following embodiments.

Embodiment 1. A method of synthesizing a crystalline molecular sieve having MSE framework type, the method comprising crystallizing a reaction mixture comprising a source of water, a source of an oxide of a tetravalent element, Y, selected from at least one of silicon, tin, titanium, vanadium, and germanium, optionally a source of a trivalent element, X, a source of an alkali or alkaline earth metal, M, and a source of a first organic cation, Q1, having one or both of the two following general structures:

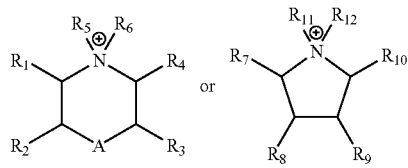

where A is a $>CR_{13}R_{14}$ group, a $>C=O$ group, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or $C_1$-$C_5$ hydrocarbon chain, where $R_5$, $R_6$, $R_{11}$, and $R_{12}$ are each independently a $C_1$-$C_5$ hydrocarbon chain, and where one of the $R_5$ and $R_6$ groups can alternately be connected to one of the $R_{13}$ and $R_{14}$ groups to form a $C_1$-$C_5$ hydrocarbon linking moiety.

Embodiment 2. The method of embodiment 1, wherein the at least 3 of the $R_1$-$R_4$ groups or the $R_7$-$R_{10}$ groups are hydrogen, and wherein at least one of the $R_5$ and $R_6$ groups or at least one of the $R_{11}$ and $R_{12}$ groups is a methyl and/or ethyl group.

Embodiment 3. The method of any one of the previous embodiments, wherein the first organic cation, Q1, comprises or is a six-membered nitrogen-containing ring, A is a $>CR_{13}R_{14}$ group, all the $R_1$-$R_4$ and $R_{13}$-$R_{14}$ groups are hydrogen, and the $R_5$ and $R_6$ groups together have a number of carbon atoms that sum to between 2 and 6.

Embodiment 4. The method of any one of the previous embodiments, wherein the first organic cation, Q1, comprises or is a six-membered nitrogen-containing ring, A is an $>O$ group, all the $R_1$-$R_4$ and $R_{13}$-$R_{14}$ groups are hydrogen, and the $R_5$ and $R_6$ groups together have a number of carbon atoms that sum to between 2 and 6.

Embodiment 5. The method of any one of the previous embodiments, wherein the first organic cation, Q1, comprises or is a six-membered nitrogen-containing ring, A is a $>CR_{13}R_{14}$ group, all but one of the $R_1$-$R_4$ groups are hydrogen, the one of the $R_1$-$R_4$ groups that is not hydrogen is connected to one of the $R_{13}$-$R_{14}$ groups, forming a bicyclic ring system, and the other of the $R_{13}$-$R_{14}$ groups is a $C_1$-$C_5$ hydrocarbon.

Embodiment 6. The method of any one of the previous embodiments, wherein the first organic cation, Q1, comprises or is a five-membered nitrogen-containing ring, all the $R_7$-$R_{10}$ groups are hydrogen, and the $R_{11}$ and $R_{12}$ groups together have a number of carbon atoms that sum to between 2 and 6.

Embodiment 7. The method of any one of the previous embodiments, wherein said reaction mixture comprises a source of an oxide of trivalent element, X, selected from at least one of aluminum, boron, gallium, iron, and chromium.

Embodiment 8. The method of embodiment 7, wherein one or more of the following are satisfied: a total molar ratio of structure directing agent cation, Q1, to oxide of tetravalent element, Y, in said reaction mixture is from about 0.01 to about 1, e.g., from about 0.03 to 0.7; a molar ratio of oxide of tetravalent element, Y, to oxide of trivalent element, X, in general form $YO_2/X_2O_3$, in said reaction mixture is from about 4 to about 200, e.g., from about 8 to about 120; a molar ratio of water to oxide of tetravalent element, Y, in said reaction mixture is from about 5 to about 200, e.g., from about 14 to about 50; a molar ratio of hydroxyl group concentration to oxide of tetravalent element, Y, in said reaction mixture is from about 0.05 to about 1, e.g., from about 0.15 to about 0.75; a molar ratio of alkali or alkaline earth metal, M, to oxide of tetravalent element, Y, in said reaction mixture is from about 0.05 to about 2, e.g., from about 0.10 to about 0.90; and seeds of an MSE framework type molecular sieve are present in an amount such that a weight ratio of seeds to oxide of tetravalent element, Y, in said reaction mixture is between about 0.001 and about 0.3; e.g., from about 0.01 to about 0.08.

Embodiment 9. The method of any one of the previous embodiments; which further comprises a source of a second organic cation, Q2, having the following general structure: $R_1$—$R_3$—$R_2$, where $R_1$ and $R_2$ are the same or different, and where $R_1$ or $R_2$ or both $R_1$ and $R_2$ are an N-alkylpiperidinium group of the formula

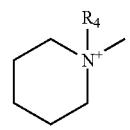

(I)

or where $R_1$ or $R_2$ or both $R_1$ and $R_2$ are a quinuclidinium group of the formula

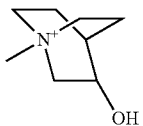

(II)

where $R_3$ is an polymethylene group of the formula $(CH_2)_n$, where n is from 4 to 6 (e.g., is 4 or 5), or where $R_3$ is a cylcoalkylene group having from 5 to 8 carbon atoms, and where $R_4$ is an alkyl group having 1 to 4 carbon atoms (e.g., a methyl group).

Embodiment 10. The method of any one of the previous embodiments, which further comprises a source of a second organic cation, Q2, having a hindered piperazine structure similar to the six-membered ring, Q1, but where A is instead an >N—$R_{15}$ group, and where $R_{15}$ is a $C_4$-$C_{12}$ cyclic, branched, and/or hydroxy-functionalized hydrocarbon moiety.

Embodiment 11. The method of embodiment 10, wherein the first organic cation, Q1, and the second organic cation, Q2, are present in the reaction mixture in a molar ratio from about 1:5 to about 99:1.

Embodiment 12. The method of any one of the previous embodiments, wherein the tetravalent element, Y, comprises silicon, the trivalent element, X, comprises aluminum, and the alkali or alkaline earth metal, M, comprises potassium.

Embodiment 13. The method of any one of the previous embodiments, wherein the alkali or alkaline earth metal, M, comprises substantially no sodium.

Embodiment 14. A crystalline molecular sieve having an MSE framework type and containing within its pore structure a single-nitrogen-containing organic cation, Q1, having one or both of the two following general structures:

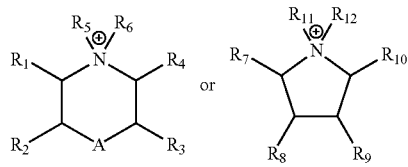

where A is a >$CR_{13}R_{14}$ group, a >C=O group, or an >O group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, and where one of the $R_5$ and $R_6$ groups can alternately be connected to one of the $R_{13}$ and $R_{14}$ groups to form a $C_1$-$C_5$ hydrocarbon linking moiety.

Embodiment 15. The crystalline molecular sieve of embodiment 14, wherein the single-nitrogen-containing organic cation, Q1, comprises an N,N-dialkyl-piperidinium cation, an N-alkyl-quinuclidinium cation, an N,N-dialkyl-morpholinium cation, an N,N-dialkyl-pyrrolidinium cation, or a combination thereof.

EXAMPLES

In order to more fully illustrate the nature of the invention and the manner of practicing same, the following examples are presented.

Examples 1-32

Syntheses of MSE Framework Material Using Solely Single-nitrogen Ammonium Monocations as SDAs In Examples 1-32, roughly similar preparations were used to create reaction mixtures for forming MCM-68 materials. All of these Examples utilized a total [OH⁻]/SiO$_2$ molar ratio of about 0.6 (though the molar ratios of the sources of hydroxyl ions, namely Q/SiO$_2$ and K/SiO$_2$ were adjusted so that they added to a molar ratio of about 0.6) and a H$_2$O/SiO$_2$ molar ratio of about 25, and were conducted at about 160° C. using about 5-7 wt % ratio of MCM-68 seeds to silica (seeds originating from crystals made using N,N-dimethyl-N'-cyclohexyl-piperazinium hydroxide). Ludox™ AS-30 or AS-40, which is 30 or 40 wt % (respectively) colloidal silica in water and which is commercially available from Aldrich of Milwaukee, Wis., was used as the source of YO$_2$/silica. Alcoa™ C-31 alumina trihydrate was used as the source of X$_2$O$_3$/alumina. Potassium hydroxide pellets (88 wt % KOH, remainder water) were used as the source of M/potassium. In these Examples, aqueous solutions of various Q cations with hydroxide counterions were used (e.g., from about 0.8 mmol/g to about 2.0 mmol/g). Other variables, such as the chemical composition of Q, Si/Al ratio, K/SiO$_2$, Q/SiO$_2$, and the like, are listed in Table 2 below.

Also included in Table 2 below are the phases that were observed in the product (as analyzed by XRD methods), listed roughly in order of highest to lowest content. Though MCM-68 (MSE) was the target product, a common impurity phase in the observed products was sanidine (orthoclase), which can be difficult to detect, as its major peaks can tend to overlap, particularly with the mid-angle peaks of MCM-68. Other impurities can include ZSM-11 (MEL) and IM-5 (IMF) material, which are both more silica-rich than the MCM-68 (and whose concentration can thus tend to increase as the Si/Al molar ratio increases in the preparations. Still other noted impurities can include erionite (ERI), ferrierite (FER), ZSM-5 (MFI), mordenite (MOR), ZSM-12 (MTW), nonasil (NON), offretite (OFF), phillipsite (PHI), potassium hydrogen disilicate (KHSi$_2$O$_5$), and various layered phases.

The following experimental procedure is specific to Example 2. Similar materials were used in differing concentrations to satisfy the recited variables for Examples 1 and 3-32. Though different exact quantities of each reagent may have been used, one of ordinary skill in the art should be able to envision the specific inputs for Examples 1 and 3-32, based upon the information given for Example 2 and the differences noted in Table 2. It was noted that Example 8 was conducted without using seeds of MCM-68 material.

About 4.08 grams of an aqueous solution of N-methyl-N-butyl-pyrrolidinium hydroxide (~1.10 mmol/g of Q cations and [OH⁻] counterions) was added to ~1.57 grams deionized water within a ~23-mL Teflon cup. About 0.29 g KOH (88 wt % in water) was dissolved in the solution, and then ~0.117 grams of Alcoa™ C-3l alumina trihydrate was dissolved in the basic solution by heating to about 160° C. for about 45 minutes in a sealed Teflon container. About 2.25 grams of Ludox™ AS-40 was then mixed into the solution to create a relatively uniform suspension. About 0.04 grains of MCM-68 seeds were then added to the suspension. The Teflon liner was then capped and sealed within a ~23-mL Parr steel autoclave. The autoclave was then placed in an air oven at about 160° C. under tumbling conditions for either 64 hours or 7 days (see Table 2). After workup of the product (e.g., centrifugation;

~3× wash with deionized water, drying), powder XRD showed it to be MCM-68 with a minor amount of sanidine (orthoclase) impurity.

Because sanidine/orthoclase is an aluminum-rich phase, it was hypothesized that its formation could be eliminated and/or minimized by decreasing the relative concentration of the

TABLE 2

Reaction conditions/results seeded preparations to form MCM-68

| SDA cation | Example | Si/Al (gel) | KOH/SiO$_2$ | QOH/SiO$_2$ | Time | Phase(s) |
|---|---|---|---|---|---|---|
| N-methyl-N-butyl-pyrrolidinium | 1 | ~10 | ~0.5 | ~0.1 | ~64 hrs | ERI, orthoclase |
|  | 2 | ~10 | ~0.3 | ~0.3 | ~7 days | MSE, minor sanidine |
|  | 3 | ~18 | ~0.3 | ~0.3 | ~7 days | MSE, possible minor IMF/MEL |
|  | 4 | ~21 | ~0.3 | ~0.3 | ~7 days | MSE, trace IMF/MEL |
|  | 5 | ~24 | ~0.3 | ~0.3 | ~7 days | MEL, MSE |
| N-methyl-N-propyl-pyrrolidinium | 6 | ~10 | ~0.5 | ~0.1 | ~64 hrs | ERI, orthoclase |
|  | 7 | ~10 | ~0.3 | ~0.3 | ~76 hrs | MSE, minor sanidine |
|  | 8 | ~18 | ~0.3 | ~0.3 | ~5 days | MFI, sanidine |
|  | 9 | ~18 | ~0.3 | ~0.3 | ~7 days | MFI, sanidine |
| N-methyl-N-butyl-morpholinium | 10 | ~10 | ~0.5 | ~0.1 | ~3 days | OFF |
|  | 11 | ~10 | ~0.3 | ~0.3 | ~5 days | MOR, minor MFI, minor MSE |
| N-methyl-N-propyl-morpholinium | 12 | ~10 | ~0.5 | ~0.1 | ~7 days | MSE, sanidine, possible minor NON and minor layered |
|  | 13 | ~10 | ~0.3 | ~0.3 | ~5 days | MOR |
|  | 14 | ~13 | ~0.5 | ~0.1 | ~7 days | KHSi$_2$O$_5$, sanidine, trace MSE |
| N-methyl-N-propyl-piperidinium | 15 | ~15 | ~0.5 | ~0.1 | ~7 days | Unidentified dense phase, trace MSE |
|  | 16 | ~15 | ~0.3 | ~0.3 | ~7 days | MSE, trace sanidine? |
|  | 17 | ~18 | ~0.3 | ~0.3 | ~5 days | MSE, minor MOR |
|  | 18 | ~21 | ~0.3 | ~0.3 | ~7 days | MSE, minor MOR |
| N-methyl-N-butyl-piperidinium | 19 | ~15 | ~0.5 | ~0.1 | ~7 days | Unidentified dense phase, minor sanidine |
|  | 20 | ~15 | ~0.3 | ~0.3 | ~7 days | MSE, trace sanidine |
|  | 21 | ~18 | ~0.3 | ~0.3 | ~7 days | MSE, minor MOR and sanidine |
|  | 22 | ~21 | ~0.3 | ~0.3 | ~7 days | MSE, minor sanidine |
|  | 23 | ~24 | ~0.3 | ~0.3 | ~7 days | MSE, minor layered |
|  | 24 | ~24 | ~0.3 | ~0.3 | ~7 days | MSE, minor MOR + MEL |
| N-methyl-trihydroxyethyl-ammonium | 25 | ~15 | ~0.5 | ~0.1 | ~7 days | MOR, FER |
|  | 26 | ~15 | ~0.3 | ~0.3 | ~7 days | MFI |
| N-methyl-N-ethyl-piperidinium | 27 | ~15 | ~0.5 | ~0.1 | ~7 days | OFF, KHSi$_2$O$_5$, minor sanidine |
|  | 28 | ~15 | ~0.3 | ~0.3 | ~7 days | sanidine |
| 3-hydroxy-N-methyl-quinuclidinium | 29 | ~15 | ~0.5 | ~0.1 | ~7 days | KHSi$_2$O$_5$, sanidine |
|  | 30 | ~15 | ~0.3 | ~0.3 | ~7 days | ERI |
| N,N-diethyl-morpholinium | 31 | ~15 | ~0.5 | ~0.1 | ~7 days | MOR, trace MSE |
|  | 32 | ~15 | ~0.3 | ~0.3 | ~14 days | MOR, MFI |

In Table 2, it is noted that Examples 2-4, 7, 12, 16-18, and 20-24 resulted in sufficiently high MSE framework type (MCM-68) product yield with sufficiently low impurity yield. It was also noted that the preparations with higher relative KOH concentration generally yielded aluminum-rich zeolites and/or minerals such as erionite, offretite, and/or orthoclase/sanidine. Of the structure directing agents that produced sufficiently high MCM-68 (MSE) yield as a major phase (e.g., the methylpropyl and methylbutyl derivatives of pyrrolidinium and piperidinium cations), that purity generally tended to occur predominantly with the lower relative KOH concentrations. There was one interesting exception, however—the methylpropyl derivative of morpholinium, where the preparation with relatively high KOH concentration (Example 12) yielded MCM-68 as the major phase, while the relatively low KOH concentration (Example 13) yielded mordenite (MOR). Because this result was so counter-intuitive and inconsistent with the results for the other molecules, those Examples were repeated, resulting in a confirmation of the product observations.

source of X. By increasing the Si/Al molar ratio from about 10 to about 18 for the N-methyl-N-butylpyrrolidinium SDA cation, the sanidine gave way to minor impurities, ZSM-11 (MEL) and/or IM-5 (IMF), that were more silica-rich than the MCM-68. The preparations including N-methyl-N-propylpyrrolidinum appeared to be even more sensitive; upon increasing the Si/Al molar ratio from about 10 to about IS, the only phases observed were ZSM-5 (MFI) and sanidine, which incidentally mirror the phases observed for product made in the absence of seeds. The piperidinium derivatives appeared to be the most selective of this group—when the Si/Al molar ratios in these preparations were about 15 or above (e.g., from about 15 to about 21), both methylpropyl and methylbutyl varieties yielded MCM-68 as the major phases.

For the preparation conditions in these Examples, it seems that Si/Al molar ratios of about 15 or less (e.g., from about 10 to about 15) yielded MCM-68 product with relatively low levels of impurities. Because impurities like mordenite, sanidine, and even loll can often be difficult to discern in the powder XRD traces containing MCM-68, the presence of such impurities can sometimes be difficult to establish. FIG. 1 shows powder XRD patterns for a sequence of products from Examples 20-24 (using N-methyl-N-butylpiperidinium as the SDA cation) at different Si/Al molar ratios, in comparison to the XRD pattern of a previously-synthesized MCM-68 preparation using N,N-dimethyl, N'-cyclohexyl-piperazinium hydroxide as the SDA. In FIG. 1, the degree of peak overlap can make it difficult to discern the presence of impurities, but the line markers near the x-axis represent standard sanidine peaks. The proposed mordenite (MOR) impurity is typically most noticeable by a right shoulder on the peak around 9.5° 2θ, while MFI/MEL-type impurities can sometimes be manifested by a left shoulder on the peak around 8° 2θ.

It is further noted that the length of the alkyl substituent(s) on the ammonium cation can be an important determinant of product phase purity and/or selectivity. When the propyl or butyl groups of the piperidinium cations (Examples 15-24) were replaced with an ethyl group (Examples 27-28), sanidine was the only product observed at the lower potassium concentration and at Si/Al molar ratio of about 15, compared to primarily MCM-68 (MSE).

It should be further noted that the preparation of Example 8 was accomplished without the use of any MCM-68 seeds, and the preparation of Example 24 was accomplished using the equivalent amount of MCM-68 seeds originating from the product of Example 23, instead of from the product of the N,N-dimethyl-N'-cyclohexylpiperazinium SDA cation.

Examples 33-63

Syntheses of MSE Using Combinations of Single-nitrogen Ammonium Monocations and Other Cations as SDAs In Examples 33-63, roughly similar preparations were used to create reaction mixtures for forming MCM-68 materials. All of these Examples utilized a $H_2O/SiO_2$ molar ratio of about 28 and a Si/Al molar ratio of about 40, and were conducted at about 160° C. using about 7 wt % ratio MCM-68 seeds to silica. (seeds originating from crystals made using N,N-dimethyl-N'-cyclohexylpiperazinium hydroxide).

Ludox™ AS-30 or AS-40, which is 30 or 40 wt % (respectively) silica in water and which is commercially available from Aldrich of Milwaukee, Wis., was used as the source of $YO_2$/silica. Aluminum nitrate solution (about 15 wt % in water) was used as the source of $X_2O_3$/alumina. Potassium hydroxide solution (~18 wt % KOH in water) was used as the source of M/potassium. In these Examples, aqueous solutions of various Q1 cations with hydroxide counterions were used in combination with a single additional Q2 cation (in all cases, N,N-dimethyl-N'-cyclohexyl-piperazinium hydroxide), also in aqueous solution (e.g., from about 0.8 mmol/g to about 2.0 mmol/g for both Q1 and Q2). Other variables, such as the chemical composition of Q1, the molar ratio of Q1/Q2, the total [$OH^-$]/Si molar ratio, the K/Si molar ratio, the total Q/Si molar ratio, and the like, are listed in Table 3 below.

Also included in Table 3 below are the phases that were observed in the product (as analyzed by XRD methods), listed roughly in order of highest to lowest content. Though MCM-68 (MSE) was the target product, impurity phases were occasionally observed in the products. Such impurities can comprise, but are not limited to, erionite (ERI), ferrierite (FER), IM-5 (IMF), ZSM-11 (MEL), ZSM-5 (MFI), mordenite (MOR), ZSM-12 (MTW), nonasil (NON), offretite (OFF), phillipsite (PHI), potassium hydrogen disilicate ($KHSi_2O_5$), sanidine (orthoclase), and various layered phases.

The experimental procedure for each of Examples 33-63 was similar to that in Example 2, except the deionized water was first combined with both Q1 and Q2 solutions; then, instead of aluminum trihydrate, the appropriate amount of aluminum nitrate solution was dissolved therein, followed by the addition of the silica source and the potassium hydroxide source. Seeds (about 2 mg per about 28 mg $SiO_2$ from the Ludox™-AS30 silica source) were also included in each preparation. The respective concentrations of the different components were calculated, based on their weight percent contents, to satisfy the recited variables for Examples 33-63. Though different exact quantities of each reagent may have been used, one of ordinary skill in the art should be able to envision the specific inputs for these Examples, based upon the information given for Example 2 and the differences noted herein for Examples 33-63.

TABLE 3

Reaction conditions/results seeded preparations to form MCM-68

| Q1 SDA cation | Example | Q1/Q2 ratio | Q/Si | K/Si | Total $OH^-$/Si | Days | Phase(s) |
|---|---|---|---|---|---|---|---|
| N-methyl-N-ethyl-piperidinium | 33 | ~3:1 | ~0.30 | ~0.30 | ~0.60 | ~7 | MCM-68 |
| | 34 | ~3:1 | ~0.26 | ~0.26 | ~0.52 | ~7 | MCM-68, minor amorphous |
| | 35 | ~20:1 (FIG. 4) | ~0.30 | ~0.30 | ~0.60 | ~7 | MCM-68 |
| | 36 | ~1:1 | ~0.09 | ~0.26 | ~0.35 | ~7 | MCM-68, minor MTW |
| | 37 | ~9:1 | ~0.15 | ~0.45 | ~0.60 | ~3 | MCM-68, OFF |
| | 38 | ~1:1 | ~0.15 | ~0.45 | ~0.60 | ~3 | MCM-68, OFF |
| | 39 | ~20:1 | ~0.30 | ~0.30 | ~0.60 | ~3 | MCM-68 |
| N-methyl-N-butyl-morpholinium | 40 | ~3:1 | ~0.30 | ~0.30 | ~0.60 | ~7 | MCM-68 |
| | 41 | ~1:1 | ~0.15 | ~0.45 | ~0.60 | ~7 | MCM-68, minor OFF |
| | 42 | ~20:1 | ~0.30 | ~0.30 | ~0.60 | ~7 | MCM-68, PHI |
| | 43 | ~9:1 | ~0.15 | ~0.45 | ~0.60 | ~3 | MCM-68, OFF |
| | 44 | ~1:1 | ~0.15 | ~0.45 | ~0.60 | ~3 | MCM-68 |
| | 45 | ~3:1 | ~0.30 | ~0.30 | ~0.60 | ~3 | MCM-68 |
| | 46 | ~3:1 | ~0.26 | ~0.26 | ~0.52 | ~3 | MCM-68 |
| | 47 | ~1:1 | ~0.09 | ~0.35 | ~0.26 | ~3 | MCM-68 |
| N-methyl-N-butyl-pyrrolidinium | 48 | ~9:1 | ~0.13 | ~0.39 | ~0.52 | ~7 | MCM-68 |
| | 49 | ~3:1 | ~0.18 | ~0.18 | ~0.35 | ~7 | MCM-68, minor $KHSi_2O_5$ layered |
| | 50 | ~20:1 | ~0.30 | ~0.30 | ~0.60 | ~7 | MCM-68, PHI |
| | 51 | ~9:1 | ~0.15 | ~0.45 | ~0.60 | ~3 | MCM-68, OFF |

TABLE 3-continued

Reaction conditions/results seeded preparations to form MCM-68

| Q1 SDA cation | Example | Q1/Q2 ratio | Q/Si | K/Si | Total OH⁻/Si | Days | Phase(s) |
|---|---|---|---|---|---|---|---|
| | 52 | ~3:1 | ~0.26 | ~0.26 | ~0.52 | ~3 | MCM-68, minor amorphous |
| | 53 | ~9:1 | ~0.13 | ~0.39 | ~0.52 | ~3 | MCM-68, minor MFI/MEL |
| | 54 | ~3:1 | ~0.26 | ~0.26 | ~0.52 | ~3 | MCM-68, minor MFI/MEL |
| | 55 | ~1:1 | ~0.13 | ~0.39 | ~0.52 | ~3 | MCM-68, minor MFI/MEL |
| | 56 | ~1:1 | ~0.15 | ~0.45 | ~0.60 | ~3 | MCM-68, minor MFI/MEL |
| N-methyl-N-butyl-piperidinium | 57 | ~3:1 | ~0.30 | ~0.30 | ~0.60 | ~7 | MCM-68, PHI |
| | 58 | ~1:1 | ~0.15 | ~0.45 | ~0.60 | ~3 | OFF, MCM-68 |
| N-methyl-N-propyl-pyrrolidinium | 59 | ~1:1 | ~0.15 | ~0.45 | ~0.60 | ~3 | MCM-68, OFF |
| | 60 | ~3:1 | ~0.30 | ~0.30 | ~0.60 | ~3 | MCM-68, PHI |
| N-methyl-N-propyl-piperidinium | 61 | ~9:1 | ~0.15 | ~0.45 | ~0.60 | ~3 | MCM-68, PHI |
| | 62 | ~9:1 | ~0.13 | ~0.39 | ~0.52 | ~3 | MCM-68 |
| | 63 | ~1:1 | ~0.13 | ~0.39 | ~0.52 | ~1 | MCM-68, minor MEL/MFI |

Examples 64-66

Figure 2:
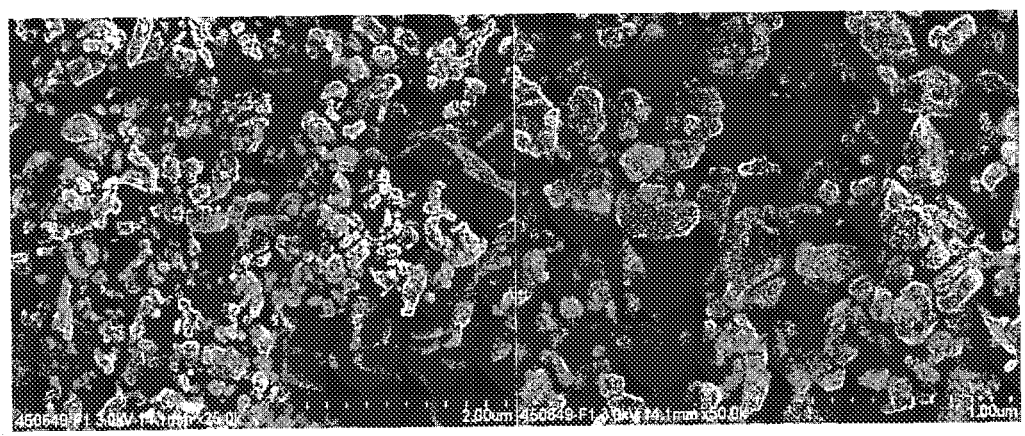
FIG. 2 shows scanning electron microscopy (SEM) images of the product from the preparation of Example 35.

Syntheses of MSE Framework Material Using Solely Single-nitrogen Ammonium Monocations as SDAs Based upon the positive results from the product of Example 35 (SEM images for which are shown in FIG. 2), where mostly N-ethyl-N-methylpiperidinium cation was used as the SDA, with only a relatively small amount of Q2, N-methyl-N-ethylmorpholinium cations were explored, as they are relatively isostructural at the ammonium site to the similarly derivatized piperidinium cations (an etheric oxygen replaces the methylene at the 4-position in the nitrogen-containing ring). Example 64 thus describes a preparation utilizing an Si/Al molar ratio of about 40, a K/Si ratio of about 0.5, and a Q/Si ratio of about 0.3 (and thus an [OH⁻]/Si ratio of about 0.8).

Figure 3:
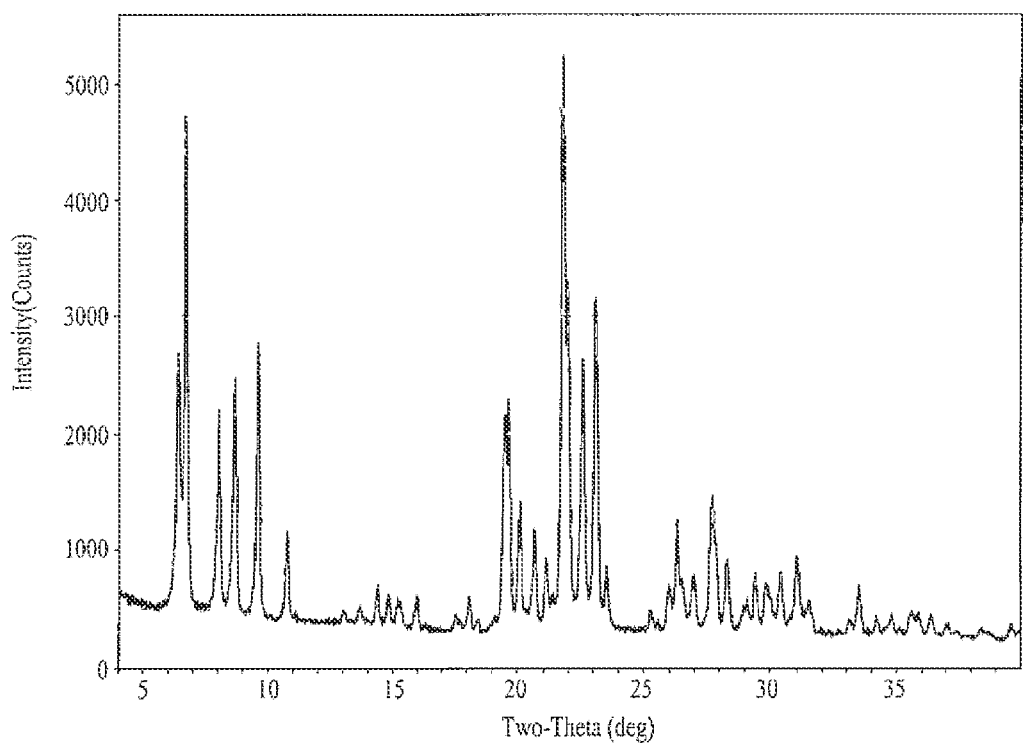
FIG. 3 shows a powder x-ray diffraction (XRD) trace of the product from Example 64.
Figure 4:
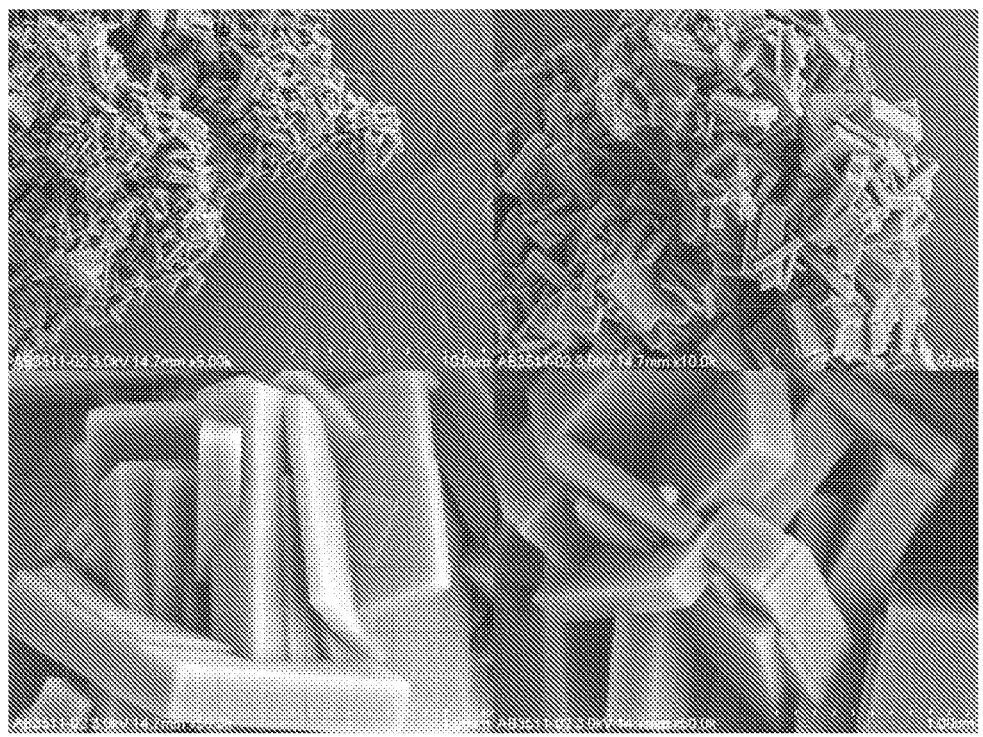
FIG. 4 shows scanning electron microscopy (SEM) images of the product from the preparation of Example 64.

For Example 64, about 4.59 grams of an aqueous solution of N-methyl-N-ethylmorpholinium hydroxide (~0.98 mmol/g of Q cations and [OH⁻] counterions) was added to ~2.03 grams deionized water within a ~23-mL Teflon insert for a steel Parr autoclave. To this solution, about 0.48 grams of KOH pellets (~88 wt %, remainder water) was dissolved in the solution. About 0.03 grams of Alcoa™ C-31 alumina trihydrate was dissolved in the basic solution by heating to about 160° C. for about 45 minutes, and then about 2.25 grams of Ludox™ AS-40 was added thereafter to create a relatively uniform suspension. About 0.04 grams of MCM-68 seeds were then added to the suspension. The Teflon™ liner was then capped and sealed inside the steel autoclave, which was then placed in a spit within an oven at about 160° C. under tumbling conditions (~3 rpm) for about 3 days. After workup of the product (e.g., multiple washes with ~250 mL total deionized water, drying), powder XRD (FIG. 3) showed it to be relatively pure MCM-68. The total yield of solid product was about 033 grams, SEM images of which are shown in FIG. 4.

The preparation of Example 64 was repeated for Example 65, except the synthesis was stopped after about 1 day, instead of about 3 days. After workup of the product, powder XRD from the shorter synthesis time still showed it to be relatively pure MCM-68.

Figure 5:
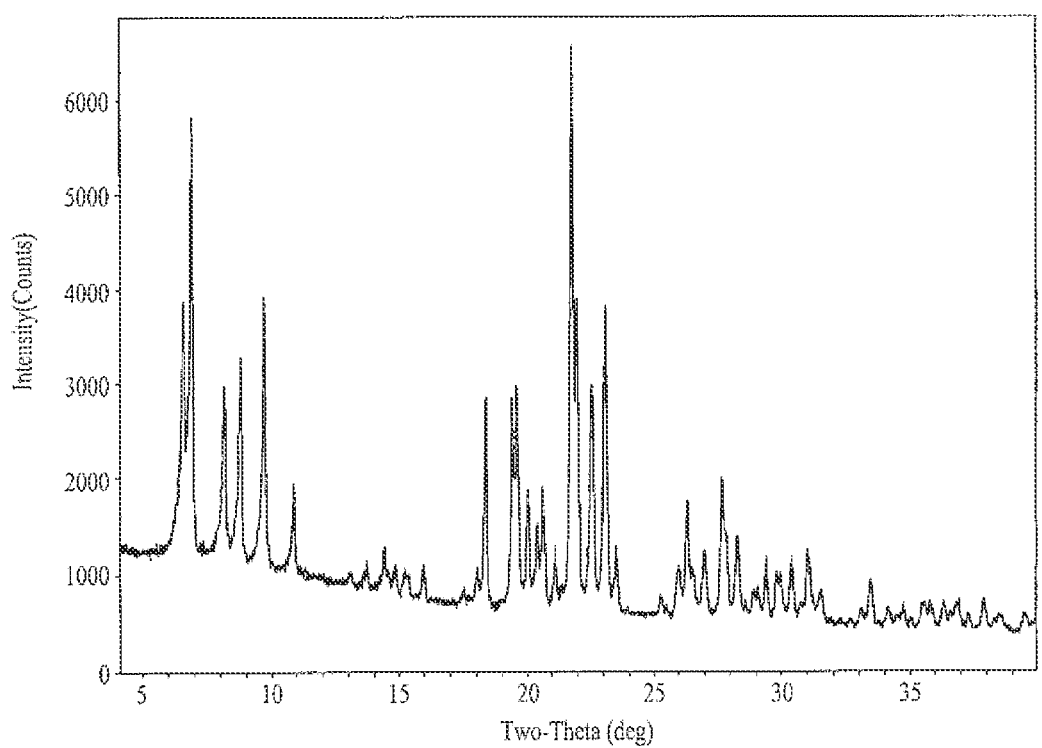
FIG. 5 shows a powder x-ray diffraction (XRD) trace of the product from Example 66.

The preparation of Example 64 was repeated for Example 66, except that the Si/Al molar ratio was decreased to about 10 by using an increased amount (about 0.12 grams, as opposed to about 0.03 grams) of Alcoa™ C-31 alumina trihydrate. After workup of the product (e.g., multiple washes with ~250 mL total deionized water, drying), powder XRD (FIG. 5) showed it to be primarily MCM-68, with a minor gibbsite impurity. The total yield of solid product was about 0.49 grams.

Examples 67-68

Syntheses of MSE Framework Material Using Solely Single-nitrogen Ammonium Monocations as SDAs In Example 67, an N-ethyl-N-methylpiperidinium cation was used by itself (with no Q2), in a preparation otherwise similar to Example 64, except that the synthesis was stopped after about 2 days instead of about 3 days. The total yield of solid product was about 0.23 grams. After workup of the product, powder XRD from the shorter synthesis time still showed it to be relatively pure MCM-68.

In Example 68, an N,N-dimethylmorpholinium cation was used by itself (again with no Q2), in a preparation otherwise similar to Example 64, except that the synthesis was stopped after about 4 days, instead of about 3 days. The total yield of solid product was about 0.19 grams. After workup of the product, powder XRD still showed it to be relatively pure MCM-68.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of synthesizing a crystalline molecular sieve having an MSE framework type, the method comprising crystallizing a reaction mixture comprising a source of water, a source of an oxide of a tetravalent element, Y, selected from at least one of silicon, tin, titanium, vanadium, and germanium, optionally a source of a trivalent element, X, a source of an alkali or alkaline earth metal, M, and a source of a first organic cation, Q1, having one or both of the two following general structures:

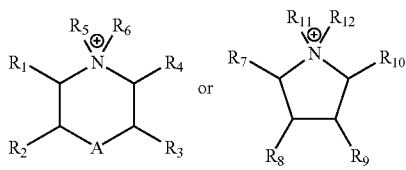

where A is a >CR$_{13}$R$_{14}$ group, a >C=O group, or an >O group, where R$_1$, R$_2$, R$_3$, R$_4$, R$_7$, R$_8$, R$_9$, and R$_{10}$ are each independently hydrogen, a hydroxyl group, or a C$_1$-C$_5$ hydrocarbon chain, where R$_{13}$ and R$_{14}$ are each independently hydrogen or a C$_1$-C$_5$ hydrocarbon chain, where R$_5$, R$_6$, R$_{11}$, and R$_{12}$ are each independently a C$_1$-C$_5$ hydrocarbon chain, and where one of the R$_5$ and R$_6$ groups can alternately be connected to one of the R$_{13}$ and R$_{14}$ groups to form a C$_1$-C$_5$ hydrocarbon linking moiety.

2. The method of claim 1, wherein the at least 3 of the R$_1$-R$_4$ groups or the R$_7$-R$_{10}$ groups are hydrogen, and wherein at least one of the R$_5$ and R$_6$ groups or at least one of the R$_{11}$ and R$_{12}$ groups is a methyl and/or ethyl group.

3. The method of claim 1, wherein the first organic cation, Q1, comprises or is a six-membered nitrogen-containing ring, A is a >CR$_{13}$R$_{14}$ group, all the R$_1$-R$_4$ and R$_{13}$-R$_{14}$ groups are hydrogen, and the R$_5$ and R$_6$ groups together have a number of carbon atoms that sum to between 2 and 6.

4. The method of claim 1, wherein the first organic cation, Q1, comprises or is a six-membered nitrogen-containing ring, A is an >O group, all the R$_1$-R$_4$ and R$_{13}$-R$_{14}$ groups are hydrogen, and the R$_5$ and R$_6$ groups together have a number of carbon atoms that sum to between 2 and 6.

5. The method of claim 1, wherein the first organic cation, Q1, comprises or is a six-membered nitrogen-containing ring, A is >CR$_{13}$R$_{14}$ group, all but one of the R$_1$-R$_4$ groups are hydrogen, the one of the R$_1$-R$_4$ groups that is not hydrogen is connected to one of the R$_{13}$-R$_{14}$ groups, forming a bicyclic ring system, and the other of the R$_{13}$-R$_{14}$ groups is a C$_1$-C$_5$ hydrocarbon.

6. The method of claim 1, wherein the first organic cation, Q1, comprises or is a five-membered nitrogen-containing ring, all the R$_7$-R$_{10}$ groups are hydrogen, and the R$_{11}$ and R$_{12}$ groups together have a number of carbon atoms that sum to between 2 and 6.

7. The method of claim 1, wherein said reaction mixture comprises a source of an oxide of trivalent element, X, selected from at least one of aluminum, boron, gallium, iron, and chromium.

8. The method of claim 7, wherein one or more of the following are satisfied:
a total molar ratio of structure directing agent cation, Q1, to oxide of tetravalent element, Y, in said reaction mixture is from about 0.01 to about 1;
a molar ratio of oxide of tetravalent element, Y, to oxide of trivalent element, X, in general form YO$_2$/X$_2$O$_3$, in said reaction mixture is from about 4 to about 200;
a molar ratio of water to oxide of tetravalent element, Y, in said reaction mixture is from about 5 to about 200;
a molar ratio of hydroxyl group concentration to oxide of tetravalent element, Y, in said reaction mixture is from about 0.05 to about 1;
a molar ratio of alkali or alkaline earth metal, M, to oxide of tetravalent element, Y, in said reaction mixture is from about 0.05 to about 2; and
seeds of an MSE framework type molecular sieve are present in an amount such that a weight ratio of seeds to oxide of tetravalent element, Y, in said reaction mixture is between about 0.001 and about 0.3.

9. The method of claim 8, wherein one or more of the following are satisfied:
a total molar ratio of structure directing agent cation, Q1, to oxide of tetravalent element, Y, in said reaction mixture is from about 0.03 to about 0.7;
a molar ratio of oxide of tetravalent element, Y, to oxide of trivalent element, X, in general form YO$_2$/X$_2$O$_3$, in said reaction mixture is from about 8 to about 120;
a molar ratio of water to oxide of tetravalent element, Y, in said reaction mixture is from about 14 to about 50;
a molar ratio of hydroxyl group concentration to oxide of tetravalent element, Y, in said reaction mixture is from about 0.15 to about 0.75;
a molar ratio of alkali or alkaline earth metal, M, to oxide of tetravalent element, Y, in said reaction mixture is from about 0.10 to about 0.9; and
seeds of an MSE framework type molecular sieve are present in an amount such that a weight ratio of seeds to oxide of tetravalent element, Y, in said reaction mixture is between about 0.01 and about 0.08.

10. The method of claim 1, which further comprises a source of a second organic cation, Q2, having the following general structure:

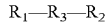

where R$_1$ and R$_2$ are the same or different, and where R$_1$ or R$_2$ or both R$_1$ and R$_2$ are an N-alkylpiperidinium group of the formula

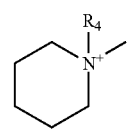

or where R$_1$ or R$_2$ or both R$_1$ and R$_2$ are a quinuclidinium group of the formula

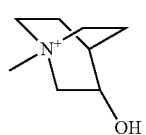

where R$_3$ is an polymethylene group of the formula (CH$_2$)$_n$, where n is from 4 to 6, or where R$_3$ is a cylcoalkylene group having from 5 to 8 carbon atoms, and where R$_4$ is an alkyl group having 1 to 4 carbon atoms.

11. The method of claim 10, wherein R$_4$ of Q2 is a methyl group and where n is 4 of 5.

12. The method of claim 1, which further comprises a source of a second organic cation, Q2, having a hindered piperazine structure similar to the six-membered ring, Q1, but where A is instead an >N—R$_{15}$ group, and where R$_{15}$ is a C$_4$-C$_{12}$ cyclic, branched, and/or hydroxy-functionalized hydrocarbon moiety.

13. The method of claim 12, wherein the first organic cation, Q1, and the second organic cation, Q2, are present in the reaction mixture in a molar ratio from about 1:5 to about 99:1.

14. The method of claim 1, wherein the tetravalent element, Y, comprises silicon, the trivalent element, X, comprises aluminum, and the alkali or alkaline earth metal, M, comprises potassium.

15. The method of claim 14, wherein the alkali or alkaline earth metal, M, comprises substantially no sodium.

16. A crystalline molecular sieve having an MSE framework type and containing within its pore structure a single-nitrogen-containing organic cation, Q1, having one or both of the two following general structures:

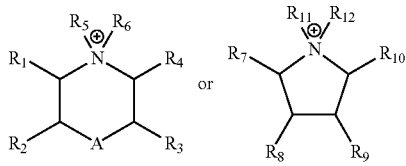

where A is a $>CR_{13}R_{14}$ group, a $>C=O$ group, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$ and $R_{12}$ are each independently a $C_1$-$C_5$ hydrocarbon chain, and where one of the $R_5$ and $R_6$ groups can alternately be connected to one of the $R_{13}$ and $R_{14}$ groups to form a $C_1$-$C_5$ hydrocarbon linking moiety.

17. The crystalline molecular sieve of claim 16, wherein the single-nitrogen-containing organic cation, Q1, comprises an N,N-dialkyl-piperidinium cation, an N-alkyl-quinuclidinium cation, an N,N-dialkyl-morpholinium cation, an N,N-dialkyl-pyrrolidinium cation, or a combination thereof.

\* \* \* \* \*